United States Patent
Monsarrat et al.

(10) Patent No.: US 10,449,676 B2
(45) Date of Patent: Oct. 22, 2019

(54) MULTI-JOINTED ROBOT DEVIATION UNDER LOAD DETERMINATION

(71) Applicant: NATIONAL RESEARCH COUNCIL OF CANADA, Ottawa (CA)

(72) Inventors: Bruno Monsarrat, Montreal (CA); Yves Fortin, Candiac (CA)

(73) Assignee: National Research Council of Canada, Ottawa, Ontario (CA)

( * ) Notice: Subject to any disclaimer, the term of this patent is extended or adjusted under 35 U.S.C. 154(b) by 201 days.

(21) Appl. No.: 15/555,406

(22) PCT Filed: Mar. 23, 2015

(86) PCT No.: PCT/IB2015/052113
§ 371 (c)(1),
(2) Date: Sep. 1, 2017

(87) PCT Pub. No.: WO2016/151360
PCT Pub. Date: Sep. 29, 2016

(65) Prior Publication Data
US 2018/0036891 A1   Feb. 8, 2018

(51) Int. Cl.
*B25J 13/08* (2006.01)
*B25J 9/16* (2006.01)

(52) U.S. Cl.
CPC .......... *B25J 13/085* (2013.01); *B25J 9/1653* (2013.01); *G05B 2219/39041* (2013.01); *G05B 2219/39183* (2013.01)

(58) Field of Classification Search
CPC ...... B25J 9/1641; B25J 9/1653; B25J 9/1692; B25J 13/085; G05B 19/404;
(Continued)

(56) References Cited

U.S. PATENT DOCUMENTS

| 4,481,592 A | 11/1984 | Jacobs et al. |
| 5,125,261 A | 6/1992 | Powley |

(Continued)

FOREIGN PATENT DOCUMENTS

| DE | 3302063 A1 | 7/1984 |
| DE | 19960482 A1 | 6/2001 |

(Continued)

OTHER PUBLICATIONS

Dumas et al. "Joint Stiffness Identification of Six-revolute Industrial Serial Robots", Robotics and Computer-Integrated Manufacturing 27,4 (2011) 881-888.

(Continued)

*Primary Examiner* — Dale Moyer
(74) *Attorney, Agent, or Firm* — Jason E. J. Davis; National Research Council of Canada

(57) ABSTRACT

Determining deviation of a multi jointed robot under load using a tribological contact between an end of the robot and any available hard constraint near the robot, involves pressing the end against the constraint, and then soliciting a movement of the end relative to the constraint in a tribologically resisted direction to apply a force that does not overbear the resistance. By measuring the force and a position encoded by the robot, a deviation of the robot under the corresponding load is determined. Correction terms may be required for deformation of the tribological surface and/or constraint. The constraint may be tooling or parts subjected to an intended process. The deviation at many measurement poses of the robot, each in multiple resisted directions, within the ordinary operating space of the robot, was used to derive compliances of the robot, and a kinetostatic model.

22 Claims, 5 Drawing Sheets

(58) Field of Classification Search
CPC ........... G05B 2219/39032; G05B 2219/39041;
G05B 2219/39183; G05B 2219/39326;
G05B 2219/40541
See application file for complete search history.

(56) References Cited

U.S. PATENT DOCUMENTS

| | | | |
|---|---|---|---|
| 5,418,890 | A | 5/1995 | Ishihara et al. |
| 5,611,147 | A | 3/1997 | Raab |
| 5,714,674 | A | 2/1998 | Tsukuda et al. |
| 7,899,577 | B2 | 3/2011 | Ban et al. |
| 8,320,612 | B2 | 11/2012 | Knobel et al. |
| 2004/0093119 | A1* | 5/2004 | Gunnarsson ........... B25J 9/1638 700/245 |
| 2005/0038563 | A1 | 2/2005 | Rauf et al. |
| 2006/0048364 | A1* | 3/2006 | Zhang ................ B23Q 17/0966 29/407.08 |
| 2008/0201015 | A1* | 8/2008 | Brogardh ............... B25J 9/1623 700/254 |
| 2012/0078418 | A1 | 3/2012 | Borm et al. |
| 2012/0098958 | A1 | 4/2012 | Metzler et al. |
| 2015/0248121 | A1* | 9/2015 | Nilsson .................. B25J 9/1641 318/569 |
| 2016/0221189 | A1* | 8/2016 | Nilsson .................. B25J 9/1653 |
| 2018/0154526 | A1* | 6/2018 | Oguri ..................... B25J 9/1692 |

FOREIGN PATENT DOCUMENTS

| | | |
|---|---|---|
| EP | 1468792 A2 | 10/2004 |
| KR | 20110019011 | 2/2011 |
| WO | 2001076830 A1 | 10/2001 |
| WO | 2010003289 A1 | 1/2010 |
| WO | 2012002137 A1 | 1/2012 |
| WO | 2014065744 A1 | 5/2014 |
| WO | 2015030650 A2 | 3/2015 |

OTHER PUBLICATIONS

Klimchik et al. "Practical Identifiability of the Manipulator Link Stiffness Parameters" (ASME 2013 IMECE2013-63123).
Alici et al. "Enhanced Stiffness Modeling, Identification and Characterization for Robot Manipulators" IEEE Transactions on Robotics, vol. 21, No. 4, Aug. 2005.
Belchior et al. "Off-line Compensation of the Tool Path Deviations on Robotic Machining: Application to Incremental Sheet Forming" Robotics and Computer-Integrated Manufacturing 29 (2013) 58-69.
Pan et al. "Improving Robotic Machining Accuracy by Realtime Compensation" ICROS-SICE Int. Joint Conf. 2009 Aug. 18-21, 2009.
Wang et al. "Improving Machining Accuracy with Robot Deformation Compensation" 2009 IEEE/RSJ Int. Conf. on Intelligent Robots and Systems.
Search Report and Written Opinion of International Application No. PCT/IB2015/052113 dated Dec. 23, 2015.
International Preliminary Report on Patentability dated Sep. 26, 2017.
English Machine Translation of WO2010003289A1.
Driels, M. R. "Using Passive End-Point Motion Constraints to Calibrate Robot Manipulators". vol. 115, Issue 3, Sep. 30, 1993, pp. 560-566.
English Machine Translation of JP 11-237296.

\* cited by examiner

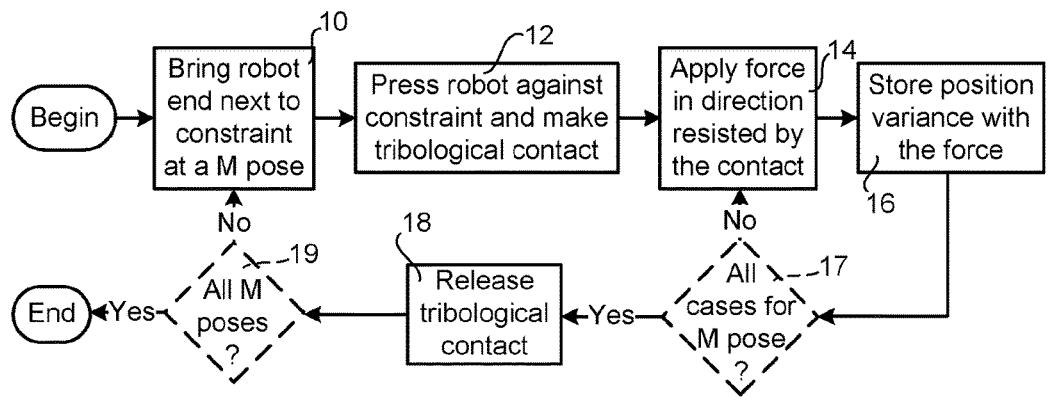
FIG. 1
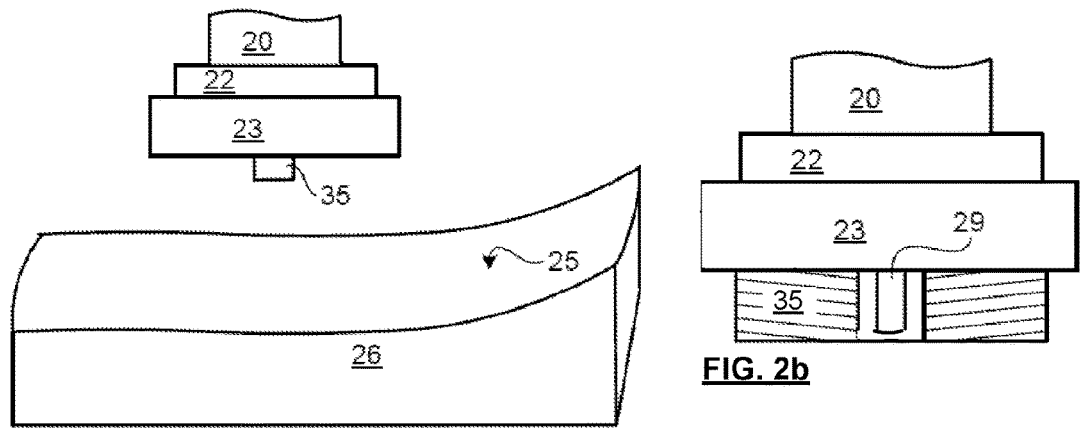
FIG. 2a
FIG. 2b
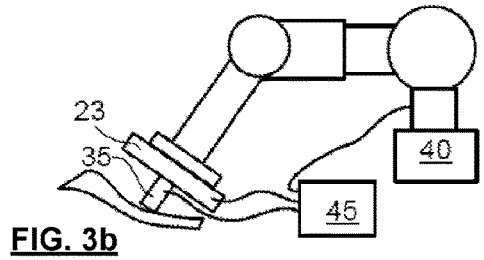
FIG. 3a
FIG. 3b
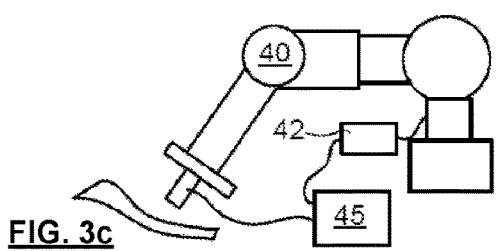
FIG. 3c
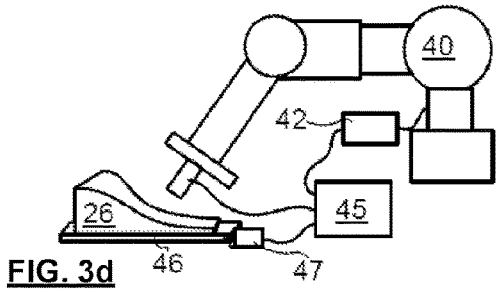
FIG. 3d

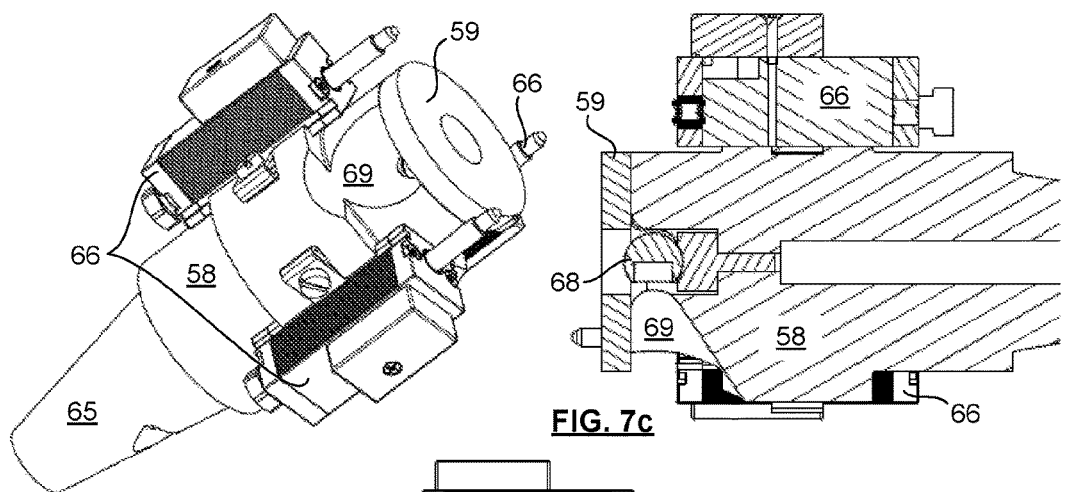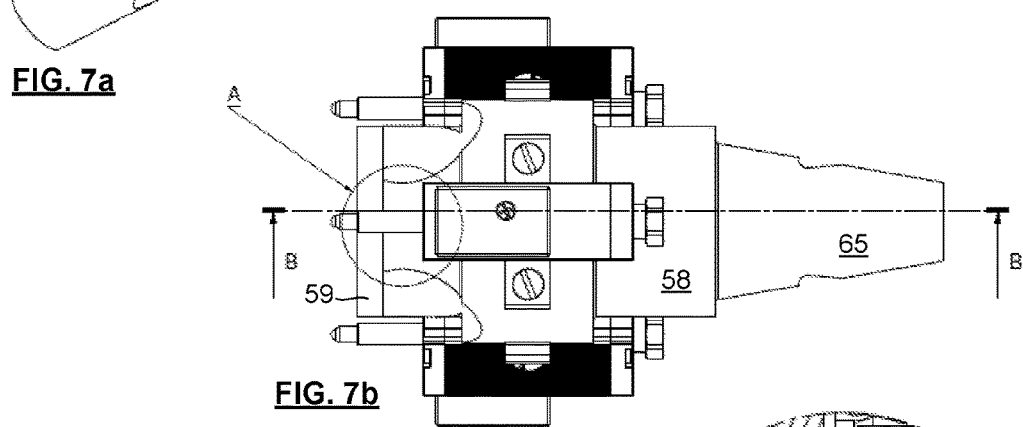

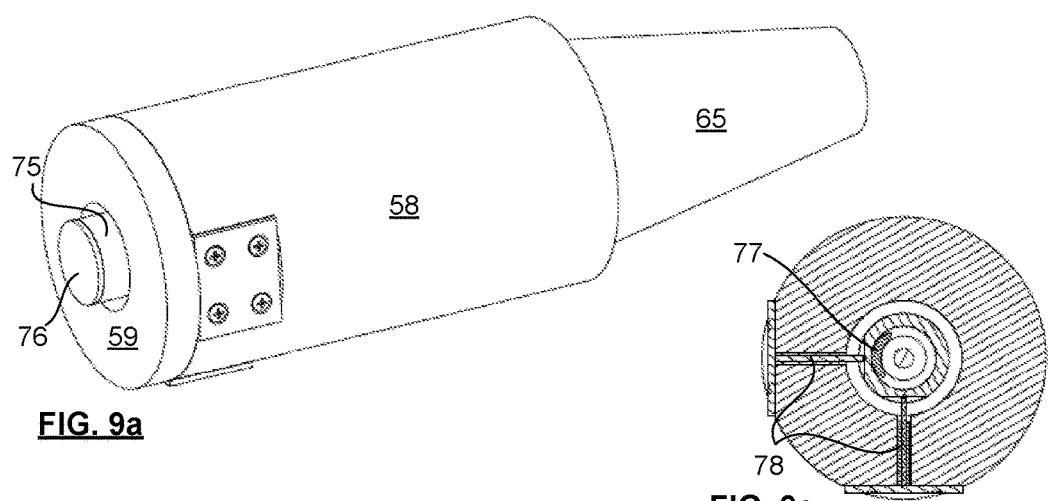
FIG. 9a
FIG. 9c
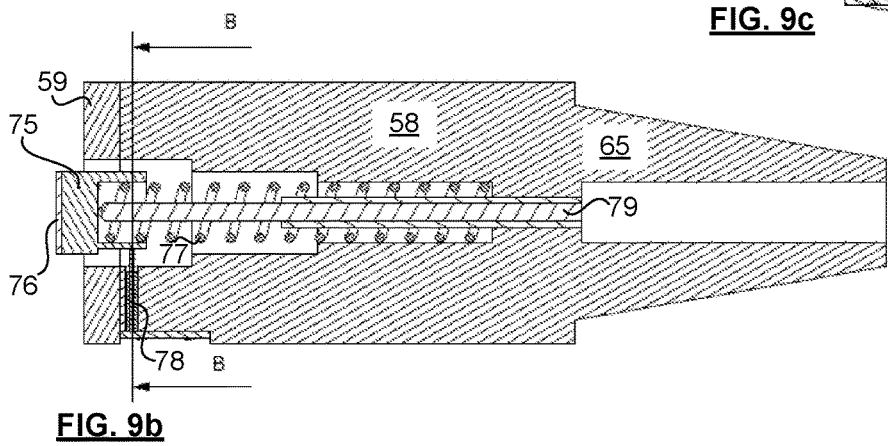
FIG. 9b

MULTI-JOINTED ROBOT DEVIATION UNDER LOAD DETERMINATION

CROSS-REFERENCE TO RELATED APPLICATIONS

This application is a national phase entry of International Patent Application PCT/IB2015/052113 filed on Mar. 23, 2015, the entire contents of which are herein incorporated by reference.

FIELD OF THE INVENTION

The present invention relates, in general to determination of deviation of a multi-jointed robot subjected to load, and in particular to a method, kit, robot end-of-arm measurement device, and apparatus for such a determination.

BACKGROUND OF THE INVENTION

Multi-jointed robots (herein robots) are very well known in the art. They are important to many industries. While some robots are required for precision movements and repetition under minimal load (an extreme of which would be a computer controlled coordinate measuring machine (CMM) for which highest accuracies are desired, where the load displaced by the robot is minimized), and an opposite extreme is a robot that is designed to apply large forces, with little concern for accuracy (for example manipulating large molten metal vessels to deposit the melt into large molds in a foundry setting). The applications of present concern require both enough accuracy (relative to the resolution of control over joints of the robot) as well as the development by the robot of enough force (relative to joint torques and link stiffnesses) to make accurate motion control under load difficult: that is, applications of interest are those that subject a robot to solicitations (forces, torques, wrenches) that excite the robot compliances (link and joint) to the extent that the robot paths fall outside of tolerance, and needs to be managed. Such applications include friction stir welding (FSW), drilling, milling, trimming, and some mounting and assembly processes, inter alia. Note that some FSW applications require the robot to resist the highest process forces (several to many thousands of Newtons) and tolerances of several tenths of a millimeter (mm) to a few mm, whereas some machining processes call for the highest accuracies, while the robot may be subject to process forces in the order of a few hundred Newtons (N).

It will be appreciated that for any particular process, a robot can be optimally designed to provide stiffness and accuracy, but the objective here is to provide a technique that will improve the utility of general purpose, commercially available robots that are suited to a large number of tasks (reconfigurable). Parallel kinematic machines, gantry systems, and manipulators with fewer mobilities, such as non-multijointed manipulators that have one or maybe two joints, can replace a robot for higher stiffness and accuracy processes, assuming the processes do not require the 3D capability (maneuverability) of the robot, but the limited reconfigurability and maneuverability of such manipulators make them inherently incapable of performing a wider variety of tasks. Ultimately it is desired to enable utilization of standard robots for applications where management of deviation under load is required to meet process specifications.

Currently, there are three approaches for applying robots to processes where management of deviation under load is required: 1—provide in-line position feedback, often through expensive, invasive and sometimes bulky automated vision guidance systems, or other sensors; 2—provide path corrections in robot programs through an off-line human intervention after inspection; or 3—provide a compliance model of the robot, and using the compliance model to compute corrections to robot trajectories in realtime, or prior to the process.

While off-line human intervention after inspection is a possibility for many processes, it is complicated, time-consuming, and requires the production of one or several defective products to determine the corrections that need to be made to the process. This is essentially a trial and error method for determining the correction, and is certainly not preferred if the parts manipulated during the process are expensive.

In-line position feedback can be an effective method in certain circumstances, and can reduce a time required for changeover (reconfiguring the robot for a different use). In-line position feedback may require instrumentation of a set of fiducial markers in the robot environment, on workpieces, and/or on tooling. Designing, arranging, and configuring fiducial markers may be difficult, time consuming, and expensive. Vision-guidance systems can also be sensitive to signal noise from environmental contamination in production facilities. Several manufacturing operations create dust or smoke that impair vision systems, as does variable ambient lighting and many other sources of optical noise. Vision-guidance systems are often expensive, and it would be desirable in many instances to obviate their use.

Realtime, compliance model-based, compensation provides an efficient means for improving the intrinsic accuracy of robots under load, with minimal instrumentation, and little sensitivity to environmental contaminants. Such techniques would be commonplace were it not that there are substantial problems with ascertaining the parameters required to populate such compliance models for robots: these parameters are obtained by deviation under load determinations.

Herein deviation is understood as a measure of how far off an end point position and pose of a particular robot is, as a whole, because of an applied load of a particular magnitude and direction while the robot is in a given pose. The deviation may be determined in a quasi-static regime, so that the measures do not depend on dynamic considerations such as inertia and acceleration, and if so, the deviations can be used to generate parameters of a kinetostatic model of the robot. Generating these parameters is known as kinetostatic calibration. Compliances may be computed from observed deviations under load in a manner known in the art. Compliances are properties of the robot that are associated with a part of the deviations that are linear as a function of applied load. Kinetostatic models are used to predict deviations for the robot when it is subject to quasi-static solicitations. Kinetostatic models can be used to produce realtime model deformation compensation.

It is also important to note the distinction between obtaining kinetostatic models and kinematic calibrations. Each robot has forward and inverse kinematics for computing a pose of the robot as a function of the instant values of the joint parameters (e.g. output by encoders), and joint positions required to put the robot into a desired pose in Cartesian space. Kinematics are purely geometrical. Establishing the parameters of forward and inverse kinematics to provide accurate transforms between robot endpoints and joint encoder positions is known as kinematic calibration, but it does not account for deviation of the robot from any load. One example of a kinematic calibration method is provided in FIGS. 22,23 of U.S. Pat. No. 4,481,592 to Jacobs et al. This calibration method involves the use of a fixture in the form of a cantilevered beam that extends rigidly from a base of a programmable manipulator. The fixture has an endpoint to which the end effector of the programmable manipulator attaches. The endpoint is exactly positioned and oriented with respect to the base thereby establishing a known position and orientation for the end effector. A similar system is taught by Raab in U.S. Pat. No. 5,611,147 for calibrating a CMM, except that the fixture of Raab is a ballbar having two spherical joints that allow the CMM to be calibrated across a spherical surface. Both the ballbar and cantilevered beam are clearly intended to provide accurate geometric references and are not intended to transfer forces between the calibration apparatus and the robot. Thus these systems are not designed to measure deviation under load.

There have been many attempts to identify, in limited ways, compliances of multi-jointed robots under load. Gravity-compensation is a known technique for identifying compliance under gravitational load. These are particularly useful for robots that principally carry loads within their work envelope, or are used in non-contact applications. Gravity-compensation models are populated by attaching a known mass to an endpoint of the robot, and comparing the forward kinematic position of the endpoint with an accurately measured position, to determine an error. There is a body of literature on gravity-compensation in robots. The compliances models produced by gravity-compensation techniques are limited in the sense that the range of solicitations that are applied are unidirectional. However, many robotic processes, like those listed above, involve process forces in a variety of directions.

Several other partial kinetostatic calibrations are known, that are not limited to solicitations of the gravitational field. It is known in the art, for example, following the teachings of Dumas et al. "Joint Stiffness Identification of Six-revolute Industrial Serial Robots", Robotics and Computer-Integrated Manufacturing 27, 4 (2011) 881-888, that given a set of wrenches applied to a robot end effector, and the displacements resulting from the wrenches, how to compute stiffness properties for a robot. A chain, mass and spring system are used to apply a desired load on the robot at any chosen pose within a given range. There are many similar methods in the literature for identifying deviations of robots using one or more masses, and/or one or more tensioned cables and suitable position measurement equipment. According to the teachings of Pan et al. ("Improving Robotic Machining Accuracy by Realtime Compensation" ICROS-SICE Int. Joint Conf. 2009 Aug. 18-21, 2009) a mass can be suspended from the robot endpoint to determine robot stiffness parameters, that are used for realtime deformation compensation. Pan et al. use a CMM for measuring the deformation. Another example is by Klimchik et al. "Practical Identifiability of the Manipulator Link Stiffness Parameters" (ASME 2013 IMECE2013-63123), which uses weights with special end-of-arm tooling to allow for more complex solicitations. A laser tracker is used for measuring displacements. According to the teachings, for example, of Alici et al., "Enhanced Stiffness Modeling, Identification and Characterization for Robot Manipulators" (IEEE Transactions on Robotics v21, No. 4, August 2005) cables can be used to apply forces on robot end effectors, and a laser tracker can be used to measure displacement under the load. According to Wang et al. "Improving Machining Accuracy with Robot Deformation Compensation" (2009 IEEE/RSJ Int. Conf. on Intelligent Robots and Systems) a cable and pulley arrangement is used to exert the force and a CMM is used to measure the displacement. A final example, to Belchior et al., "Off-line Compensation of the Tool Path Deviations on Robotic Machining: Application to Incremental Sheet Forming" (Robotics and Computer-Integrated Manufacturing 29 (2013) 58-69) which includes masses and a cable to provide more elaborate solicitations.

It will be noted that these prior art examples all require externally supplied force applicators, and external deformation measurement equipment. Avoiding either or both of these would greatly improve the state of the art. It will be appreciated that the complex equipment for applying forces on the end effectors and for measuring the displacements are onerous, and are not convenient in production environments. The use of weights allows for the application of force vectors in the direction of gravity only, while experiments with cable arrangements are invasive and more difficult to plan and implement in a production environment. The space for all of these components is often not available around a robot in a production environment, where it is surrounded by equipment and supplies. Managing cables and aligning forces is tedious, and is generally plausible only for a subset of robot poses and force vector directions. Mechanization of the externally supplied force applicators, as would be required to avoid a long, off-line measurement process in a production setting, is not taught and would generally lead to greater uncertainty in the measurement.

A more general technique for kinetostatic calibration has more recently been presented. WO 2014/065744 to Nilsson credits Bennett, Hollerbach and Henri (Bennett et al.) with the idea of: clamping a (multi-jointed) robot in a predefined pose; applying joint torques; and measuring the induced endpoint forces and torques using a force/torque sensor attached to the tool flange close to the point of clamping. It appears that Bennett et al. had no interest in measuring deviation under load, but rather teach these steps for the purpose of populating a Jacobian matrix transform (which maps forces/torques from the Cartesian frame to actuator torques, or equivalently joint velocities to endpoint velocities). Bennett et al. is proposing a kinematic calibration method, exempt from any deviation under load measurement. Nilsson's idea of clamping a multi-jointed robot in a predefined pose, commanding a predefined actuator movement, and measuring the associated actuator torque, as a way to identify the properties of that given joint, including its compliance, provides a simpler and more appealing approach compared to the calibration systems described above.

A variety of clamping techniques are discussed by Nilsson. In its background, Nilsson suggests coupling of the end effector or flange of the robot, to a rigid rod that is jointed at both ends. Nilsson also states, but does not explain, that an alternative to the rigid rod is some other mechanism that in a well-defined way restricts movement relative to the environment, but allows certain joint motions. Nilsson further teaches using a clamping item with a head and three pairs of legs as a preferred means for supporting a tool exchanger part (by which the robot is clamped), but notes that the clamping means may have any shape or form as long as it is essentially free from backlash and can provide a point in space for clamping of the movable part of the manipulator. Nilsson also teaches that the clamping may be applied at links and not just at the end effector or flange of the robot.

Nilsson also teaches that the clamping item may be elastic, such that the manipulator, after initial clamping to the clamping item, may reach a point in space in which it is clamped later, once it has achieved a resting position at the clamping item. In case of an elastic clamping item, the stiffness of the same should be known, and the elastic displacement of the clamping item will need to be determined based on tool exchanger forces, which in turn can be determined via joint torques and the kinematic model, or by using an external wrist mounted force/torque sensor.

Nilsson does not teach or suggest locking in any way other than by clamping, and considers backlash to be an important feature for selecting a clamping means. Specifically, at p. 17, Nilsson states: "Since the commanded actuator motion is known and there is essentially no motion of the drivetrain output due to the clamping, this means that the drivetrain input torque can be controlled during clamped motions". Thus Nilsson relies on the clamping to have no backlash, in order to isolate the desired phenomena at the specific joint being investigated.

The approach taught by Nilsson may not be satisfactory for multi-jointed robots. While a multi-jointed robot is shown in FIG. 1a, and is stated to be an embodiment of the invention, there are significant coupling effects between internal movements of different joints when clamped. The kinetostatic behavior of the rest of the robot when clamped, and subjected to the exerted loads, are liable to interfere with readings at the moving joint. In fact, once a predefined angular motion has been commanded to a given joint (at the input of the drivetrain), the compliance of said joint equals the commanded amplitude divided by the induced torque. Since only the isolated deviations of the said joint is sought, the reading of the induced torque must be recorded in a situation where no motion of said joint occurs. In such a situation, the entire commanded motion will be fully stored into potential elastic energy and in the drivetrain. This implies that the rest of the robot is infinitely rigid. In any real robot, however, the displacement exerted at the joint will not only excite said joint, but will induce a series of internal motions throughout the kinematic chain, until stability is reached. These internal motions are not captured by the taught method, and can be manifested by a bending or torsional deformation in the remainder of joints and links, as well as backlashes in some of the drivetrains of the non-actuated joints, with different amplitudes depending on the pose of the robot and the directions of the force and moment vectors at the clamping point. The final stable configuration will generally involve some motion at the output link of the joint to accommodate the overall deformation of the robot. This motion of the output link needs to be accounted for in Nilsson's approach (subtracted from the commanded angular motion) to make this identification process accurate.

Applying joint-wise characterizations in a situation where several joints are actuated simultaneously, or even where only one joint is actuated but where the pose of the robot is different, may not be sufficiently accurate. The net effect of several joint characterizations may not be soundly predicted by the joint positions, because the internal motions result in errors in the joint-wise measurements. The resulting associations of the measure or deduced forces/torques with positions of the joints can suffer significant inaccuracies because of the internal motions.

While coupling effects may be mitigated by clamping at each pair of links, (doing so is suggested by Nilsson), this would require a much more convoluted system than what is shown. A great number of clamping means would be required as each link has a different shape in a typical robot, such as that shown. Even if the clamping were performed at links on each side of each joint, the deformations of the links as a whole in practice may not be satisfactorily represented.

Precisely where and how the links are clamped may have a noticeable impact on the measurements. Wherever the links are clamped, there is reason for concern that the robot, viewed as a series of these segmented sections, will not behave as the whole robot does. The links themselves are important sources of compliances, but these are not accounted for.

Finally, the approach Nilsson teaches, like the systems with pulleys, cables, chains and masses, may be difficult to operate in a production setting. If clamping each joint individually is chosen, a lot of equipment is needed. If end clamping is used, the only suggested clamping station (tool changer) provides clamping only at configurations that represent a small part of the envelope of the robot, and this small part is not typically aligned with intended work space over which the robot will be used. It will be difficult to get a set of measurements that span any intended process while the robot end is fixed to a tool changer at a periphery of the robot's envelope where most tool changers are located (to avoid obstructing the workspace of the robot). As will be evident to those skilled in the art, kinetostatic calibrations benefit from deviation measurements of the robot in poses that are similar to the operating poses, and these are best achieved by measurements that span the operating poses.

Accordingly there is very little practical advice in the prior art on how to perform kinetostatic calibrations over an intended working envelope of a robot, suitable to robots in a production facility. While mechanically locking an end effector by clamping it in at least some degrees of freedom, to measure a deviation under load of a robot in a fixed pose may have been made known in the art, there remains a need for a practical and accurate technique, especially one that can be applied in industrial settings.

SUMMARY OF THE INVENTION

Applicant has discovered how to use the robot itself to generate solicitations on a multi-jointed robot for determining deviation under load at any pose that meets a convenient rigid surface (constraint) in the environment of the robot, such as a tooling, or workpiece. The technique involves pressing the robot into contact with the constraint to induce tribological contact, soliciting a movement of the robot in a direction that is resisted by the tribological contact, measuring a variation in position of the robot during the resisted movement, and associating the variation in position with a magnitude of the force in the resisted direction.

For the constraint, hardened tooling may be preferred, and it may approximate production tooling or workpieces to a desired degree. The constraint can preferably be interacted with at a variety of measurement positions that span a range of movements useful for one or more processes. As such sequences of poses, including poses that are most relevant for an intended production process, can be used to determine deviation under load. As the method avoids expensive robotic clamping stations that must be reconfigured or moved to provide a set of high stiffness positions for measurements, and generally avoids substantial prior art encumbrances, the invention is more readily applied in production environments. The invention removes the onerous and painstaking process of loading an endpoint of the robot with weights or cable and pulleys arrangements, and obviates a mechanism for clamping the end point of the robot to one or more fixed positions with respect to the base, in a fixed pose, at a periphery of the envelope of the robot. Advantageously, Applicant has developed a process for which no human intervention is needed to clamp, or operate the robot during a series of deviation measurements, and the deviation can be derived from the measurements, by a computer, for autonomous determination.

The present invention can make use of any stiff surfaces located in the environment of the robot, such as the surface of working tables or those of hardened production toolings, or even a floor, walls or other rigid support for one or more workpieces for manufacturing (joining, shaping, etc.), such objects providing a constraint needed to perform the measurement. The invention can make use of one or several constraints located in the production setting to measure the deviation under load, thus eliminating the need to either move the robot to another location or reconfigure the production equipment around the robot for measurement purposes.

This method for determining deviation under load has, as advantages: 1) the avoidance of a mechanized high stiffness clamping apparatus that limits the poses in which deviation can be measured; 2) a possibility of achieving fully automated deviation under load determination at any number of positions within the envelope of the robot, without human intervention; 3) a possibility of generating a variety of force vectors at any point on the constraint surface by controlling the robot; 4) a reduction of special purpose cumbersome equipment in production facilities, while permitting the determination to be performed in situ; 5) an ability to determine a deviation under load for a provisioned robot using the same equipment, tooling surfaces as well as robot configurations as those to be used to execute the intended process, and 6) an ability to account for total deviation in the kinematic chain of the multi-joint robot including those stemming from the end-of-arm equipment or from an external motion system on which the robot is mounted such as a linear track.

Accordingly, a method for determining a deviation of a multi-jointed robot subjected to a load is provided. The method involves: moving an end of the robot to a measurement pose adjacent a constraint; applying a first force to press the robot end into tribological contact with the constraint; soliciting the robot to move the end in one direction that is resisted by the tribological contact while the tribological contact is maintained, where the solicitation exerts a second force that is insufficient to overbear the tribological contact's resistance; and quantifying the second force in the resisted direction, and a variation in position of the robot from the robot's encoders resulting from the solicitation.

The method may further involve applying a material to the end of the robot or constraint prior to moving, the material selected to promote the tribological contact, for example, by mounting a friction bearing element (FBE) onto the robot directly, or via: an end effector, a production end effector, a part added to a production end effector, an end effector with one or more parts added or removed, a tool, a production tool, or a production tool with one or more parts added or removed, and wherein moving the end of the robot involves moving the FBE into position adjacent the constraint. Mounting the FBE may involve connecting an attachment bearing the FBE directly or indirectly to the robot, and the attachment may have a standard mount adapter. The material may yield more readily than the robot end or constraint, to prevent marking or material transfer during the tribological contact. The tribological contact may involve a force having a magnitude of 1 KN or greater, and still not mark or transfer material.

The method may further include determining a displacement of the robot end during the tribological contact associated with deformation of the selected material, for example by: using a well characterized deformation of the selected material, and fitting at least the first and second forces to a model of the deformation; measuring a deformation of the selected material relative to a surface of the constraint at the measurement pose; or measuring a change in position of a metrological target on the robot end with respect to a grounding of the robot, and determining the deviation by calculating a difference between the determined displacement from the variation in position, and fitting the second force and the difference to a model of robot deviation.

The constraint may provide a free surface, and a shape, size, and conformability of an area of the end that makes the tribological contact with the constraint, relative to a curvature of the free surface, may permit the robot to establish tribological contact at any location on the free surface. Moving the robot end may be performed quasistatically.

Soliciting the robot to move while the tribological contact is maintained may involve commanding the robot to maintain the first force in a direction normal to the constraint throughout the tribological contact, where the first force is greater than the second force times a pre-established constant of proportionality. The second force may have a lower magnitude than the first force.

Soliciting the movement may involve directing the robot in a force control mode to exert the second force, the force control mode being enabled by a force sensor: provisioned with the robot; mounted to the end; in an end effector; or in a friction bearing element, and forwarding at least select force control feedback from the force sensor to a processor for determining the deviation, and associating the second force with the determined deviation. Directing the robot in force control mode may involve: operating the robot in a force control mode to apply the first force, and exert the second force, while keeping the robot free of moments in pitch and yaw; operating the robot in a force control mode to apply the first force, and exert the second force, where an effective joint in the robot end precludes the robot from applying moments in pitch and yaw; or operating the robot in a force control mode to apply the first force, and exert the second force, and may apply a torque in pitch and yaw, where the torque in pitch and yaw are also quantified, and forwarded to the processor used to determine the deviation.

The method may further include the processor determining the deviation by: receiving the variation in position of the robot determined from a difference between encoder readouts at first and second stable positions, the second stable position being produced when the robot stabilizes after the second force is applied; receiving from the force sensor the select force feedback, which includes at least the second force; using a third force, which is a force applied at the first stable position, and the second force to compute a difference in force; and calculating a deviation of the robot under a load identified with the difference in force. The first stable position may be the measurement pose adjacent the constraint. The third force applied in the first stable position may be less than 10% of a magnitude of the first force. If the force applied in the first stable position is at most a negligible force, the third force is null, the difference between the second and third force is the second force.

The soliciting and quantifying may be repeated for a plurality of the resisted directions including diametrically opposed directions for tribological contact at each of one or more measurement poses.

The method may further include improving the tribological contact by one or more of the following: cleaning a surface of the constraint and a part of the robot that meet to form the tribological contact prior to moving; changing a pressure in a sealed fluid chamber near the tribological contact to produce enhanced surface contact by the pressure difference; or engaging a magnetic tool positioned behind the constraint.

Also accordingly, an apparatus is provided for measuring deviation of a multi-jointed robot under load. The apparatus includes: a robot with an end flange; a friction bearing element (FBE) mounted to the end flange directly, or via an end effector or end tooling; a force sensor within the robot, or mounted to the end flange directly, or via an end effector, end tooling, or the FBE; and a computer processor with a memory, in communication with the force sensor and the robot, wherein the computer processor has program instructions for: directing the robot to move the FBE into a measurement pose adjacent to a constraint located within an envelope of the robot; applying a first force to press the FBE into tribological contact with the constraint; soliciting the robot to move in one direction that is resisted by the tribological contact while the tribological contact is maintained, where the solicitation exerts a second force that is insufficient to overbear the tribological contact's resistance; and quantifying the second force and a change in position of the robot from the robot's encoders due to the resistance to the solicitation, and using same to determine a deviation of the robot.

The apparatus may further include a joint mounted between a flange of the robot and an interface where the tribological contact is made, that has at least one effective rotational degree of freedom, about an axis perpendicular to a local normal of the interface, to neutralize moments about the axis.

The FBE may be composed of a material that does not mark or transfer material during the tribological contact at a force having a magnitude of 1 KN or greater.

The apparatus may further include a metrological target mounted to the robot between the end flange and an interface where the tribological contact is made, the metrological target adapted to be used for measuring a deformation of the FBE during the tribological contact, and wherein the computer processor is adapted to subtract the measured displacement from the change in position of the robot, to determine the deviation. The metrological target may be used to measure a movement of the end flange with respect to a frame of reference of a floor, or relative to the constraint.

The force sensor may provide realtime output of force data to a data processor, the realtime output being used to effect a force control mode for the robot that permits the computer processor to apply the first force, solicit the robot, and quantify.

The program instructions for using the quantified second force and change in position may include program instructions for: determining the variation in position of the robot from a difference between encoder readouts at first and second stable positions, the second stable position being produced when the robot stabilizes after the second force is applied, receiving from the force sensor at least selected force feedback, which includes at least the second force; using a third force, which is a force applied at the first stable position, and the second force to compute a difference in force; and calculating a deviation of the robot under a load as the variation in position identified with the difference in force.

The FBE may have a sealed fluid chamber near the tribological contact to produce enhanced surface contact by controlled application of a pressure difference within the chamber.

Also accordingly, a kit is provided for use in determining deviation of a multi-jointed robot under load, the kit comprising a friction bearing element (FBE) for mounting to an end of the robot and one or more of: a) user instructions for performing the method described above; b) non-transitory computer readable program instructions for: determining a variation in position of the robot by from a difference between encoder positions at first and second stable positions, wherein at least the second stable position is a result of a force exerted in a tribologically resisted direction after the robot is pressed against a constraint to form a tribological contact; receiving from a force sensor mounted directly or indirectly to the robot, at least select force feedback for computing at least a difference between forces applied at the first and second stable positions; and calculating a deviation of the robot under a load as the variation in position associated with difference between the forces; and c) non-transitory computer readable program instructions for obtaining a specification of the constraint, and a location of the FBE mounted directly or indirectly to the robot, and commanding the robot to perform the following steps: directing the robot to move the FBE into a measurement pose adjacent to a constraint located within an envelope of the robot; apply a first force to press the FBE into tribological contact with the constraint; solicit the robot to move in one direction that is resisted by the tribological contact while the tribological contact is maintained, where the solicitation exerts a second force that is insufficient to overbear the tribological contact's resistance; and record a position of the robot as determined from its encoders, when the second force is solicited.

The kit may further include one or more of: d) an end effector for the robot to which the FBE is mounted or readily mountable; e) a production end effector for the robot to which the FBE is mounted or readily mountable with one or more parts of the production tooling removed; f) a tool to which the FBE is mounted or readily mountable; g) a production tool to which the FBE is mounted or readily mountable; and h) a metrological target adapted for measuring a deformation of the FBE when first and second forces are applied.

Also accordingly a robot end-of-arm measurement device is provided for mounting to a robot, the measurement device including: a body having two opposite ends, a first end bearing an adapter for coupling to a flange of a robot, an end effector or a tool mounted to a robot, or an end effector or tool mounted to the robot with one or more parts added or removed, and a second end with a friction bearing element FBE having surface properties promoting tribological contact with hardened smooth tooling; and a target for a metrological system to measure a position of the measurement device.

The robot end-of-arm measurement device may further include an LVDT that references the target to measure a deformation of the FBE.

The target may be a retroreflector, and the adapter may be a standard mount adapter.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 1 is a flow chart schematically illustrating principal steps in a method in accordance with an embodiment of the present invention;

FIGS. 2a,b schematically illustrate end effectors adapted for use in the present invention;

FIGS. 3a-d schematically illustrate various apparatus embodiments;

FIGS. 7a,b,c are schematic pictorial, plan, and partial section views of a first robot end-of-arm measurement device for providing accurate measurement of slip and deformation of the interaction;

FIGS. 8a,b,c,d are schematic pictorial, side, section, and enlarged sectional views of a second robot end-of-arm measurement device featuring a joint that neutralizes moments; and FIGS. 9a,b,c are schematic pictorial, longitudinal cross-section, and transverse cross-section views of a third robot end-of-arm measurement device featuring local measurement of slip and deformation of the interaction.

DESCRIPTION OF PREFERRED EMBODIMENTS

Figure 4:
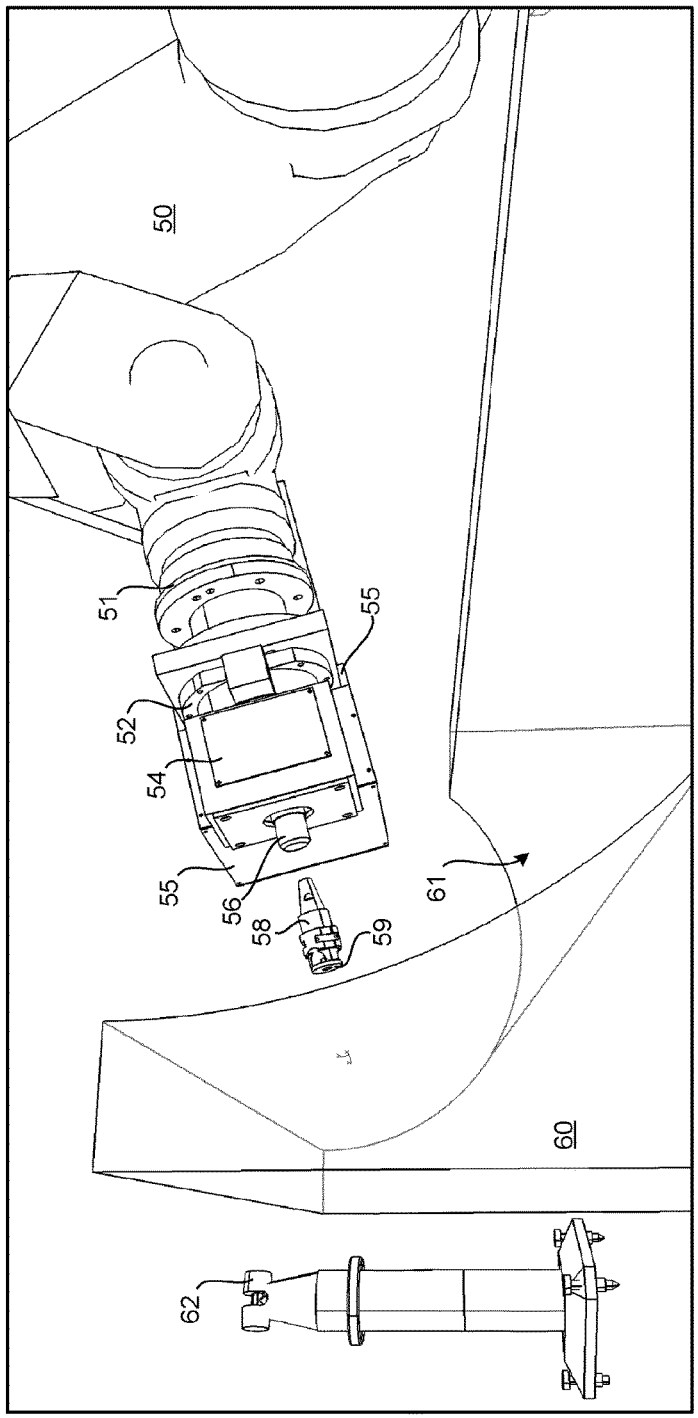
FIG. 4 schematically illustrates an apparatus used to demonstrate the present invention.

Herein a technique is described for determining a multi-jointed robot deviation under load. The term deviation refers to a tendency for a robot to yield to a force that is exerted on it. As such it encompasses link deformations, deformations in joints, backlash of joints, etc. The deviation measures of the robot at a number of poses and directions of forces may be aggregated and used to assess compliance of the robot, or used to generate process-specific, or general purpose, correction of the robot under load.

The technique involves pressing the robot into tribological contact with a constraint surface at one or more poses of the robot, referred to as measurement poses. Herein tribological contact refers to intimate surface to surface interface contact that resists slippage or movement, at least in one direction, such as a direction that is linearly independent of a direction of the pressing, which may be normal to the interface. The tribological contact therefore resists interfacial movement of the robot with respect to the surface of the constraint in at least one translational or rotational direction. More than one direction may be resisted, and this allows for a wider variety of load-based deviation measurements to be obtained from the robot at the (nominally same) measurement pose. By pressing the robot against the constraint, resistance to interfacial movement in 5 of 6 Cartesian directions (+/-x, +/-y, +z), as well as +/- pitch, +/- yaw and +/- roll is effected, however the +z direction, and pitch and yaw directions are not tribologically resisted. Tribological resistance refers to a resistance to a movement that is produced by surface interface effects, such as by friction, the effect of sandpaper, grit, or the like, or other mechanical interlock at the surface that is fairly construed as tribological.

The determination of the deviation under load may be a part of an automated procedure that involves making the tribological contact with the constraint, followed by actuation in one or more resisted directions, and measurements, to compile a list of deviation under load measurements corresponding to a plurality of load cases at a plurality of measurement poses (robot configurations). The list may be post-processed to compute parameters of a kinetostatic model, or compliance properties for the robot as a whole, in a manner known in the art.

A force sensor is required in order to measure the deviation under load. The force sensor may be in-built, or mounted to the robot, preferably nearest the tribological contact interface practicable. The force sensor may be built into an end effector of the robot, such as a production end effector or the force sensor may be added for the specific purpose of determining deviation under load. It is preferable for the same force sensor that will be used to determine forces applied during intended use of the robot (e.g. of the production end effector) to be used to determine the deviation, to avoid systematic errors the result from using different force sensors. Many processes for which calibration under load would be most valuable, have force sensors built into the end effectors to either effect a force control mode, or to monitor the forces applied by the robot, and one of the uses of deviation under load measurements is to correct for an effect of compliance on the robot's trajectory. It is generally advantageous to use the force sensor that is going to be used for the calibrated robot, to perform the deviation under load testing, and accordingly, for an important class of applications, the force control mode will be available.

The force sensor allows the robot to operate in a force control mode, as opposed to a position control mode. In this mode, the robot may be commanded to move in the resisted direction to reach a force consign. While a same force can be applied by directing the robot to move a certain distance into the constraint as it is to direct it to apply a given force, it is substantially simpler to operate the robot in force control mode, if available, as long as the forces are effectively monitored. Unlike the joint-specific method taught by Nilsson, this method expressly uses all joints of the robot during the force control mode. It is well known in the art to make use of a force sensor on the robot and to use the robot in a force control mode, where a specific force in a specific direction is commanded. A full variety of force control schemes and their associated techniques known in the art may be used to achieve the desired force control performance, while avoiding overshot, and providing reliable and accurate measures of the load.

The robot is controlled by a control processor that has access to the force sensor feedback data to enable the force control mode. A measurement processor, which may be the control processor or another, determines or receives the forces in each direction (e.g. Cartesian directions in a 3 DoF force sensor or Cartesian directions and moments from a 6 DoF force sensor) using the sensor data, and determines or receives contemporaneous observed position readings of the robot. The robot's position and orientation readings are obtained by applying encoder readings to forward kinematic transforms, to obtain the Cartesian position.

The constraint is understood to be a single object having one or more surfaces for the tribological contact, multiple objects each having one or more surfaces, or multiple objects that together define parts of one or more single surfaces. The surfaces are preferably free surfaces. A free surface refers to a surface that is free of attachment mechanisms, gripping features such as clamps or other large scale features (on the scale of the area of tribological contact) that mechanically localize or rigidly fix the robot to the constraint. The fact that the surface is free allows for easy, collision-free, movement into the position at any user-selected location as opposed to a narrowly prescribed position required by a fixed clamping or like mechanical features.

The tribological contact is preferably assisted by providing a material between the robot (robot meaning the multi-jointed kinematic machine and the end effectors, tools or attachments thereto) and the constraint, the material being selected to promote tribological contact. The material may be provided by a friction bearing element (FBE) mounted on the robot. As such, a force applied in the normal direction, that is directly resisted by the constraint, can be used to generate frictional forces that resist transverse (+/−x, +/−y), and rotational (+/− roll), interfacial movements. Alternatively the material may be a sandpaper, or high hardness grit that improves a tribological contact, resisting transverse movements once the tribological contact is established.

Establishing tribological contact may involve additional mechanisms, such as pressurizing a chamber near the tribological contact to improve surface contact, such as by positive or negative pressure, by cleaning the constraint and robot surface prior to pressing the two together, or using a magnetic or electromagnetic field to urge the surfaces into closer contact. If negative pressure (suction) is used, a pneumatic or hydraulic port of the robot, or end effector, may be used to pressurize the chamber, and therefore may not require any further equipment or power supplies. It will be appreciated that suction against clean surfaces may substantially improve a tribological contact produced by the robot, reduce a magnitude of the force needed to maintain a tribological contact that resists a given force in the resisted direction, and allows for greater resisted force with less microslippage at the interface. Similarly magnetic or electromagnetic actuation may promote more intimate surface contact, albeit with the added requirement of equipment behind the constraint, or limiting the constraints used to magnet objects.

One advantage of using a FBE, or other material is that many durable materials, of which the robot flange, end effector, tool or other attachment are likely to be made, and of which the constraint is likely to be made, will invariably mark each other at the force magnitudes required to produce the tribological contact. Permanent marking may not be desirable. Material transfer by various wear mechanisms may also be induced, which would generally be undesirable, as buildup and/or removal of material on the surface, may increase uncertainty in the measurements, or vary the tribological properties of the interface. Finally, proper material selection for the FBE may ensure a more stable, and consistently higher, coefficient of friction in a variety of operating conditions, allowing for greater transverse load cases with less slippage at the interface, in a variety of conditions. If permanent marking is to be avoided, one of the two surfaces generally needs to yield more readily. Applicant currently prefers to use a FBE that deforms and has a predictable surface finish, to one that marks the constraint. Of course the constraint could be protected with a deformable material having surface properties that promote the tribological contact, to accomplish the same effect. An alternative would be a highly marking surface, for example with angular protrusions (small with respect to a scale of the area of the tribological contact) of hardened material that penetrate one or both interface surfaces, to improve resistance of the transverse forces. For example, Applicant has successfully adhered sandpaper to a tool mounted to a robot to generate tribological contact. The sandpaper can substantially improve tribological resistance. For example, using a very fine grit (320), which minimizes marking of the constraint in comparison with coarser grits, was sufficient to double a tribological resistance of the polyurethane FBE used below. An advantage of the sandpaper, or an FBE of very low profile, is negligible deformation under load which may not require monitoring.

A FBE with a given size, geometry, and material will have a limited, known and preferably well characterized deformation, which means that the deformation can be modelled, and predicted with desired accuracy. In some embodiments, a measurement of the robot's encoders and the force feedback is used with a verified model of the FBE's deformation, to correct such displacements. While modelling the deformation is advantageous, in embodiments where the constraint has a high curvature, or pressure distribution is expected to vary, such modelling may be challenging, and alternatives may be preferred. Applicant currently prefers to measure the deformation of the FBE, rather than using a model-based predictive approach because the constraints used have been highly curved, and this method also captures unwanted deformation of other components (including tooling that provides the constraint) during the load, as well as displacements stemming from microslippage at the tribological contact.

There are a wide variety of sensors that may be used to measure displacements that occurs during application of a load case, by way of microslippage and deformation of the FBE, or both, if these preclude desired accuracies of the deviation under load measurements. If there is sufficient movement of the end point after the tribological contact is made to prevent a desired accuracy, the processor may receive this information as well, to compensate for this movement, to compute the accurate deviation under load.

It will further be noted that the FBE can be a part of the force sensor, if suitably instrumented. If the FBE has well characterized deformation properties, and is stable in a wide range of temperatures, humidities, and environmental conditions, a deformation of the FBE itself can be measured in 3 or 6 DoF to define the force sensor at the same time as quantifying a deformation of the FBE.

FIG. 1 is a schematic flow chart illustrating a process for determining load based deviation of a multi-jointed robot in accordance with an embodiment of the present invention. The method begins, and at step 10, the robot is set in a configuration near the constraint at a measurement (M) pose, preferably at a free surface of the constraint. This may involve providing the constraint, securing a fixture, tooling, or part that includes or defines the constraint within an envelope of the robot, and moving the robot into the pose, in any order of operation. Step 10 may involve configuring the robot for force control operation, changing end equipment (including production tooling) of the robot, and/or providing or attaching equipment for collecting data.

In a preferred embodiment, a "rest" pose of the robot is determined and stored prior to step 12. Herein obtaining a pose of the robot means getting a Cartesian position and orientation derived by applying forward kinematic transformations of the robot to encoder readings from the joints of the robot in a manner well known in the art. The rest pose is taken when the robot is under no load, or with no more than a negligible registration force between the robot end and the constraint. While the rest pose could, in theory, be taken with the robot at any non-contact position, it is generally preferred to take the rest pose adjacent the M pose, to minimize a duration of the deviation under load test, and to ensure a low speed contact with the constraint if in force control mode. Alternatively another pose with a known force may be used as a baseline (pose) to compare the robot's position and orientation when under load.

The rest pose is convenient because it has no applied force, because it is standard practice in industrial robotics to establish a normal approach for making contact with a surface, to maximize a magnitude of a difference between the rest pose force and that of one or more case load forces, and because using the rest pose as a baseline for comparing the robot's encoded position permits a variation of forces to provide a set of deviation under load measures with forces that spans a desired range of directions. If the only poses compared are both taken while the tribological contact is maintained, a small variation in the force component that maintains the tribological contact will limit variation in force differences in this direction, and therefore will limit the span of the deviation under load measures and parameter observability. It will be appreciated that a variation of the differences in forces between the baseline and load case measures is important as it determines the range of excitation of the robot, and the parameters of the robot that may be observed in the deviation under load tests. To further improve parameter observability, a plurality of baseline measures may be obtained. If a plurality of baseline measures is available, each of those could be used for comparisons with each load case, which may allow for observation of more robot parameters with each load case.

In step 12, the robot is pressed against the constraint and a tribological contact is made. This may be accomplished by commanding the robot, in force control mode, to exert a predefined force in a given direction, if available. Alternatively a force sensor may be used to monitor the force, when the robot is commanded to move a given distance into the constraint in a position control, or hybrid or other control mode, or to signal once a minimum force is developed, for example. If a force control mode is available, it may be a 3- or 6-dimensional force control mode (or any number of DoF less than 6). If the force control mode is a 3 DoF force control mode, that can only control forces in x,y,z directions, it may be preferable to provide a joint between the interface and the force sensor that eliminates pitch and yaw moments. Alternatively, the moments can be computed by other sensors when the robot is stable. If a 6 DoF force control mode is used, the moments can be consigned to 0. It will be appreciated that one or more baseline measurements may also be taken between an initial contact of the robot to the constraint, and the development of the full tribological contact. Each such measurement would be associated with a stable set of encoder readings (or equivalently the forward kinematic transforms thereof), and the force. Furthermore, a baseline measurement may be taken at a force magnitude greater than that necessary to establish and maintain the tribological contact, to provide a desired diversity of force vectors.

If the tribological contact is friction based, typically the force would be directed substantially normal to the constraint (+z direction) as the friction force depends strongly on the normal force. This may involve developing a normal interfacial force of a certain magnitude, and waiting for the force to stabilize. As will be appreciated by those of skill in the art, there may be a perceptible duration of time between when the robot endpoint leaves the rest pose and when the stability condition is met.

Establishing the tribological contact may involve a previous step of cleaning or degreasing the part of the robot where the tribological contact is to be made, and the constraint, and if a FBE is used that includes a pressurized chamber, or a magnetic or electromagnetic attractor, for improving the tribological contact, this may be actuated. An example of a pressurized chamber is a suction cup that involves an annular FBE sealing area surrounding a chamber having a volume. Actuation of a mechanical, pneumatic or hydraulic nature to expand the volume of the chamber, or rarify gas within the chamber to below ambient, will promote a more intimate contact between the annular FBE and constraint, tending to an increase in the frictional resistance. It may be preferable to apply a greater normal force prior to actuation than is applied during step 14, to ensure that a good seal is initially made. The step of pressing the robot to make the tribological contact may be required throughout the steps 14, 16, and 17.

At step 12 the pose may be determined, and a comparison of this pose with the rest pose (or any other baseline pose), corresponding to a known force, can be used to determine a deviation of the robot under a normal load. In fact, a series of deviation determinations may be made at different force magnitudes. This measurement alone is somewhat similar to a gravity-compensation scheme in that only a force in a single direction can be excited for any given M pose.

At step 14, the robot is solicited to move in a direction that will be tribologically resisted, to apply a force in the resisted direction. Care is taken to ensure that the force does not overbear the tribological resistance, for example, by characterizing the tribology of the contact and ensuring that the force is within a safety margin of the modeled tribological resistance; or detecting slippage of the contact (beyond a threshold), promptly suppressing all forces, and restarting at step 10 in the event that the forces are suppressed.

Herein a load case refers to a given force, or a prescribed force variation, applied in the resisted direction(s) to produce at least one measurable value of a deviation of the robot, where the deviation is measured with reference to the baseline measurement, which has a different total force applied. While the tribological contact is maintained, forces resisted mechanically (non-tribologically) by the constraint may also be used to generate additional measures of deviation for solicitations of pitch or yaw movements, or from the +z direction movement as described above. Solicitations having components in the resisted directions (x,y,roll) and mechanically-resisted directions (pitch,yaw) are considered to be load cases if the tribological contact substantially resists the solicitation, and provides 50% or more of the resistance to the movement. Any sequence of load cases and other deviation under load measurements may be made. It will be noted that there is an advantage to retaining only Cartesian forces and variations in Cartesian positions of the robots, or only measuring angular positions and moments during calibration processes, as complexities and additional uncertainties arise when integrating angular and positional measures.

Applicant has demonstrated that an effective way to capture the linear portion of the deviation under load when backlash may arise, is to match each load case with a load case having an opposite direction. A variety of force magnitudes may be applied in each direction, as long as the highest magnitude does not overbear the resistance provided by the tribological contact. For example, a quasistatic variation in the load case can permit continuous measurement of load case measures without holding the robot in a settled pose. Alternatively, a varying load magnitude with a higher rate of change may be used to assess deviation under non-quasistatic load. Non-quasistatic loads may be applied as they are important for processes having higher dynamic solicitations. A graph of the robot's position at successive time samples during force development of the non-quasistatic load case, or the quasistatic varying load case, may be captured.

The solicitation may preferably be provided by operating the robot in a force control mode, to exert a predefined force in one of the directions that is resisted by the tribological contact with the constraining surface. This force defines a load case under which deviation of the robot is determined. The force is applied in a direction that is resisted by the tribological contact, which direction may be linearly independent of the normal force used to produce the tribological contact.

While the force used to establish tribological contact may not need to be maintained at a highest amplitude throughout the tribological contact, especially if the tribological contact is enhanced, for example with suction, it is preferred to at least maintain a minimum normal force component applied by the robot throughout the application of one or more load cases. In the examples, a substantially constant normal force is applied starting at step 12, and continuing until that measurement pose is left.

Depending on the data handling setup, it may be trivial, or more complicated, to identify the stable pose data with the load case force for the load case measurement. If the robot controller is programmed to both control the robot and store the data, it will have a realtime feed from the force sensors and can use stability of the force and encoders to assign capture the data and identify the associated values. Alternatively, a processor may receive copies of time-stamped data streams from both the robot controller and force sensors, and use a provisioned stability time window for each measurement to fit the data, and statistically derive the associated values.

Once stability is reached, the pose of the robot is determined, as well as measured forces (and moments if present) to determine load case pose and force. The load case pose, relative to a baseline measure, such as the rest pose described above, defines a variance in pose as a function of the difference between the load case force and force in the baseline pose, which are stored (step 16). The baseline pose may have no force or negligible force, in which case the load is the force applied during the load case, and the force applied to maintain the tribological contact, and the force in the resisted directions. The baseline force may be the force to establish the tribological contact, or the comparisons may be made only between two or more load case poses. The tribological contact is released, at step 18.

The stored data may be indexed by the M pose, with other such data at the same and different M poses, to produce a table of deviation under load measures. These may be fitted to produce parameters of a kinetostatic model of the robot.

Ideally, the robot end does not move at all in response to the solicitation, but the robot joints change their encoder values, as a result of the joint actuation, and the robot's deviation. In fact, some microslippage of the tribological contact may be experienced, and some deformation of the FBE, and constraint, may occur. Furthermore, the movement from the rest pose to the tribological contact may involve initial free movement, followed by initial contact, and a buildup of force to establish the tribological contact. There may be movement of the end of the robot during these phases, and there may be some movement, called herein microslippage, during the application of the load case. If these are small enough to not interfere with a desired precision of the deviation under load measurement, they can be ignored. If not they can be determined a variety of ways.

Determining the deformation of the FBE may be as simple as using a pre-established lookup table to identify an expected deformation given the force applied, as measured by the force sensors, if the FBE is well characterized. If the FBE is expected to deform non-negligibly, and a pressure distribution across the FBE is not axis-symmetric, some attention may be called for in assessing the deformation throughout the area of contact, which may be complex to model. In cases where a highest accuracy is sought, it may be necessary to instrument the constraint to measure such deformation using a metrological system. The metrological system may output measured positions of the end of the robot to the processor that receives the pose data and force data, to associate the deformation data with the Cartesian positions and force. An additional advantage of the direct deformation measurement is that stability of the contact can be directly observed, and can be used to trigger re-recordal of the force and position and orientation readout information at a desired time.

The metrological system may also be advantageously used to correct for systematic errors. Specifically, a on-board metrological system that measures a relative position of the end of the robot with respect to a local point on the constraint can observe deformation of the FBE. An external metrological system that relates a reference position of the end effector (target) to a frame of reference fixed with respect to a grounding of the robot is well suited to observe the combined deformations of the end of the robot between the target and the constraint, as well as deformation of the tooling or part that is used as the constraint, and microslippage.

A local slippage detection mechanism may be used to identify or quantify microslippage of the FBE during or between steps 12, 14, and may additionally or alternatively measure deformation of the FBE. If the slippage detection mechanism quantifies the microslippage and/or deformation, this information can be used to remove the induced displacement, as described above. If the slippage detection mechanism merely indicates that slippage has occurred, a controller may prompt repetition of the load case, for example, under renewed or redoubled tribological contact. Microslippage may be detected without any sensors, by comparing a pose measurement under a same solicitation before and after a load case is applied.

Once a specific position variance and force are stored for a given load case, the process may iterate from step 14, whereby a new force is applied in one or more of the tribologically resisted directions, as shown in optional step 17. In this way, a single tribological contact may permit measurement of several baseline positions and several load cases, which is efficient for producing a set of deviation under load measures with forces that span a desired range of directions.

Once all of the load cases that are intended for a given M pose have completed, the process may iterate from step 10 to recommence at another M pose, for example (optional step 19). Once a prescribed set of deviations under load cases has been measured a desired number of times at all M poses, the deviation under load measurement process ends.

FIG. 2a schematically illustrates an end 20 of a robot, including a flange 22, mounted to an end effector 23. The end effector 23 may be any of the types of end effectors known in the art to perform a process; particularly processes that involve application of process forces with a requirement for accuracy.

End effector 23 may have a tool tip, or any part removed, for providing a convenient surface for mounting the FBE 35 thereto. Advantageously, the FBE 35 may have a standard mount adapter end for mounting to the end effector 23. Alternatively the FBE 35 may be mounted directly to a body of the end effector 23, or directly to flange 22 of the robot. A constraint 26 offers a free surface 25 with which the FBE 35 can make contact at any location at a normal incident angle. The free surface 25 is shown having a smooth, but irregular shape featuring concave, convex, and saddle points. The free surface 25 may be on a tooling for supporting workpieces.

The FBE 35 preferably has a distinct surface that provides a predictable tribological resistance to transverse forces, such as, according to Coulomb's law of friction, or a more elaborate model of interfacial resistance, especially under a known compression. Proper material selection for the FBE 35 provides a more stable, and consistently higher, coefficient of friction in a variety of operating conditions, allowing for greater transverse load cases with less slippage at the interface, in a variety of conditions. Applicant currently prefers to use a FBE 35 that deforms slightly and has a predictable surface finish. This way there is no problem with matter accreting on, or damage to, the FBE 35 or free surface 25.

The FBE 35 is shown provided on a tip that may be mounted to the end effector 23 in place of another tool bit or tooling piece, as this may be convenient. The tip may have any number of other functions. Below are described three end-of-arm measurement devices that could be provided as such a tip; these devices incorporate on-board or external metrological equipment. The FBE 35 may be instrumented for precise measurement of deformation, for example with strain gages, or optical or mechanical distance measurement devices. In some embodiments the instrumentation may include equipment that is distant the FBE 35, however it may be more convenient and cost effective to mount sensors to the FBE 35, for example. Control equipment for assembling data from various measuring devices may be required, as robot control stations may not be available, or conveniently reconfigured, for the process.

As noted above, the end 20, with end effector 23 is equipped with sensors and electronics to enable a force control mode. This may be built into the robot or provided through the end effector 23. Two advantages arise from using a force sensor built into a process end effector: a compliance of the production end effector is characterized by the load deviation measurements; and the force feedback provided by the force/torque sensor is the same for the deviation under load measurement and the process operations.

Herein corresponding features of respective embodiments having the same identifiers have equivalent function, and their description and operation is not repeated.

FIG. 2b, in comparison, has an annular FBE 35 surrounding a machine tip 29 of end effector 23. The annular FBE 35 has a bottom providing the tribological surface. While only two of the many possibilities of how to mount the FBE to an end 20 of a robot are shown, it will be appreciated by those of ordinary skill that a variety of other alternatives are equally practicable. For example, the FBE could be mounted to a side of the end effector 23 without considerable alteration. It should also be noted that multiple FBEs may be mounted to the end effector 23, or a single FBE could provide multiple surfaces for the tribological contact, for example at different faces, to produce tribological contacts for different poses of the robot at a same location on the constraint, or to provide different options for the tribological contact (different hardnesses or material properties to achieve different interface properties). Alternatively the FBE may be directly mounted to the tool tip 29 as a protective cap.

FIG. 3a schematically illustrates an apparatus in accordance with the present invention. The apparatus includes a multi-jointed robot 40 having at its end 20, a flange 22, to which end effector 23 is mounted, and a FBE 35, as per the embodiment of FIG. 2a. A processor 45 with a memory is provided for receiving force measurement data from a multi-axis force/torque sensor of the end effector 23, deformation information from the FBE 35 (or equivalently from an external metrological system), and at least select pose information or position of the end of the robot, from a robot controller 42. Processor 45 may perform a variety of data preprocessing on these three streams of data to identify contemporaneous data. In the illustrated embodiment, the processor 45 is responsible for logging data for each of a plurality of load cases for a given M pose. The robot controller 42 receives the force sensor data in realtime that allows for a continuous feedback loop with a provisioned response time.

In general any distribution of the tasks between the processor 45 and the robot controller 42 is possible. In alternative embodiments, the sharing of tasks between the processor 45 and robot controller 42 may be different. For example, a signal from processor 45 may be fed to the robot controller 42 to indicate when the stability is determined for a measurement (this can be accomplished using data from the FBE 35, the force sensor data, or Cartesian position and orientation data), according to a preestablished stability condition. This will also facilitate association of the 3 data streams.

FIG. 3b differs from the embodiment of FIG. 3a in that the controller 42 and processor 45 are unified. It will be appreciated that the functioning ascribed to processors 45 and controller 42 could be performed by any available data processor in the system and may alternatively be resident in the end effector 23, the FBE, or an external metrological system for measuring deformation of the FBE 35, and could be distributed across multiple processors. The processor 45 need not be in a stand-alone processor. The processor 45 may be resident on a general purpose computer with a display and manual input device.

FIG. 3c shows an embodiment with a robot 40 having a built-in force control mode and multi-axis force/torque sensor. All of the information required to perform the deviation under load determination is therefore available to control station 42, except for the deformation information from the FBE 35. The control station 42 is programmed to direct the processor 45 to request the deformation information each time stability has been reached for a given measurement.

FIG. 3d shows an embodiment wherein the constraint 26 is on a moving stage 46, operated via a controller 47. The moving stage 46 and robot 40, in force control mode, may be jointly operated to generate a load case that would not be possible with either alone.

Examples

Applicant has demonstrated the present invention using an apparatus shown in FIG. 4, featuring an industrial robot 50 (Kuka KR500 MT) and a curved tooling 60 clamped in place on a table (not in view). The tooling 60 had a concave, free, surface 61, that is defined in the view by inclusion of ghost view lines. The robot 50 is equipped with a Friction Stir Welding (FSW) end effector 54 (Friction Stir Link™

RoboStir 10 kW electric spindle), with its rotary FSW tool tip removed from socket 56, which is a conical standard mount adapter. A casing 55 for a motor for driving the electric FSW spindle is substantially occluded in FIG. 4. End effector 54 is mounted to a flange 51 of the robot 50. The end effector includes an integrated 6-DoF, ATI force sensor 52. The force sensor 52 communicated with the Kuka KRC2 robot controller (not in view) to enable force control mode operation. The force sensor 52 had been previously integrated with the robot controller to provide the force control mode.

FIG. 4 shows an exploded view of the FBE 58 inserted into the socket 56 of the FSW end effector 54, to replace the rotary FSW tool tip. The FBE 58 has a surface 59 composed of a 8 mm thick layer of polyurethane, provided for making the tribological contact. The surface 59 was characterized to have a coefficient of friction of ~0.3 when in contact with a metal like that of which the tooling 60 is composed. Tooling 60 had been designed to be very rigid so that any deformation under the load was negligible. The FBE 58 is further described below and illustrated in FIG. 7a (without the 3 LVDTs). The FBE 58 has an integrated retroreflector that is measured by a laser metrology system 62 (LTD 800 laser tracker from Leica Geosystems), because deformation of the FBE 58 was discernible.

A set of 6 calibration locations regularly distributed across the free surface 61 were chosen as M poses, and locations of these were provided to the robot controller. The robot was programmed to perform a series of deviation under load determinations at each of the 6 measurement poses, in a fully automated measurement procedure, without stopping or any human intervention.

Figure 5:
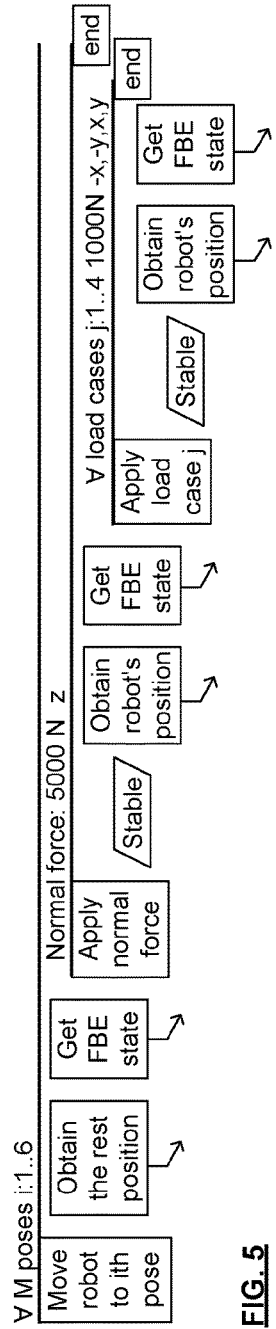
FIG. 5 is a schematic illustration of a process used to demonstrate the present invention.

FIG. 5 schematically illustrates a process used for the measurement procedure. For each of the 6 positions, the robot moves to a rest pose opposite the free surface. At each rest pose, the laser metrology system 62 was invoked to measure the position of the FBE 58, and the Cartesian position of the robot end is computed from the robot encoders. The coordinate frame for each M pose, is a tool frame for the robot as defined above: the local normal of the surface 59 (which is naturally opposite the normal of the free surface 61) defines a +z direction; and directions defined by the flange 51 of the robot define x and y.

Tribological contact is established by applying a force of 5000 N in the +z direction. While a change in the position of the end of the robot of about 5.0-7.5 mm had to be commanded in order for the robot to build such a force, no significant motion of the robot end could actually be perceived by the naked eye from a distance. In fact, the data collected during this sequence showed that around 2.0-3.0 mm of the commanded displacement was attributed to the FBE, and the remaining displacement was attributed to robot deviation. This force was maintained for a duration of the load cases. Other magnitudes could be used, but this magnitude was chosen because it provides more than sufficient Coulomb friction to avoid overbearing the tribological resistance during the desired load cases, and satisfactory excitation of the robot's links and joints.

The pose is obtained and recorded once the tribological contact is made and the robot stabilizes (a 1 s stabilization time was used and was satisfactory). The FBE state is measured by the metrology system 62, to compute a precise distance the FBE moved to establish the tribological contact including its deformation. The pose measurement without load case is repeated after application of each load case.

For each M pose and each established tribological contact, four interfacial load cases were applied: in two complementary pairs. In each case, a force of 1000 N was established, and then once stable, the robot's pose is obtained and the metrological system 62 was used to measure deformation of the FBE 58, and any microslippage at the interface. The four cases were movements in orthogonal directions +/−x and +/−y. It is within the capabilities of the system to demand different magnitudes, or temporal sequences of forces, and to observe deviation, and it is also possible to apply moments, if such are important for the application being modelled, but these were not performed. Combined with the initial purely normal initial load case, each measurement pose involves a total of 9 measurement steps, and therefore there are 54 measurement steps for the 6 poses. The time for the whole process takes less than 13 minutes to perform this process.

The FBE 58 was expected to deform during the load cases by an amount that was sufficient to frustrate the intended tolerance of the measures, and accordingly the laser metrology system 62 was used to measure this displacement. Specifically a difference between positions of the FBE at each load case was compared with the rest pose.

Figure 6A:
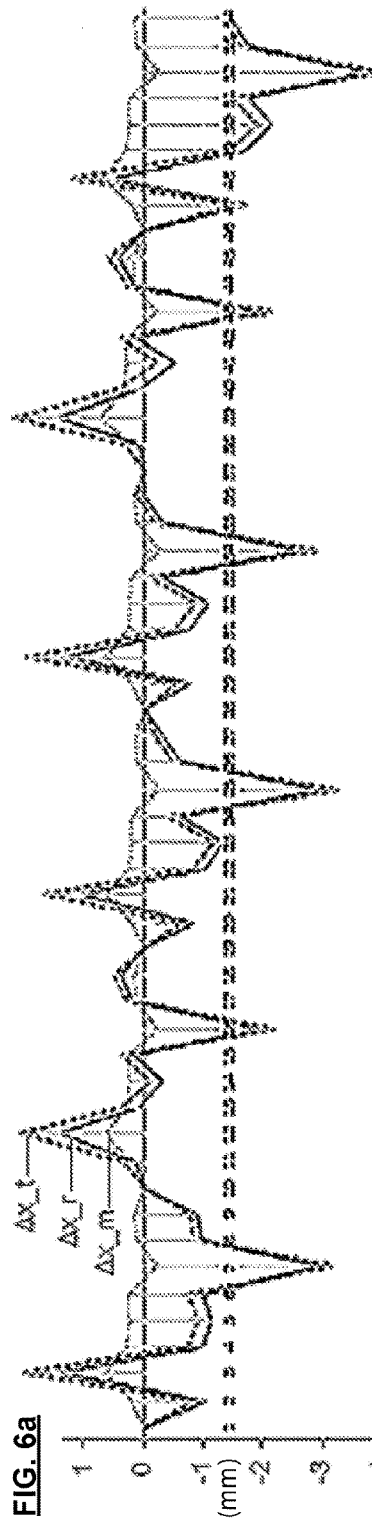
FIGS. 6a-c are graphs of data showing displacements commanded and observed in 3 directions.
Figure 6B:
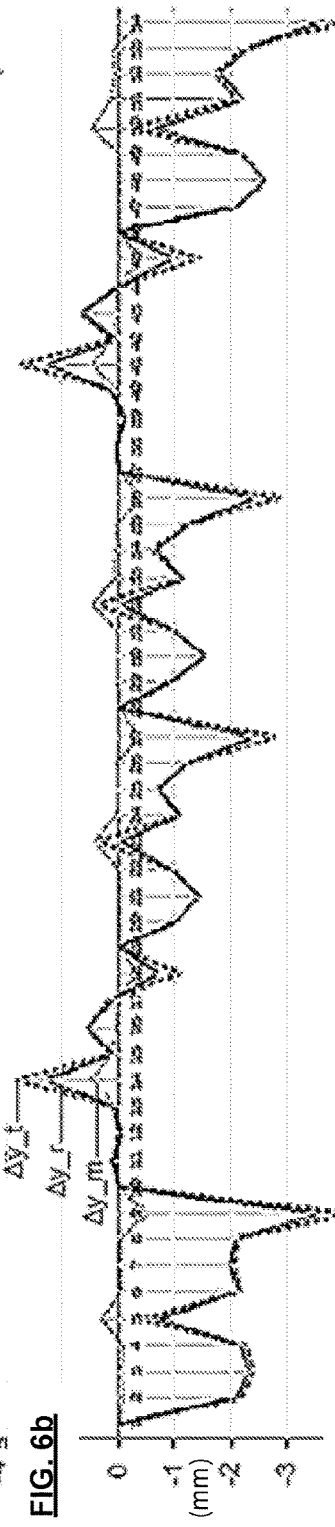
Figure 6C:
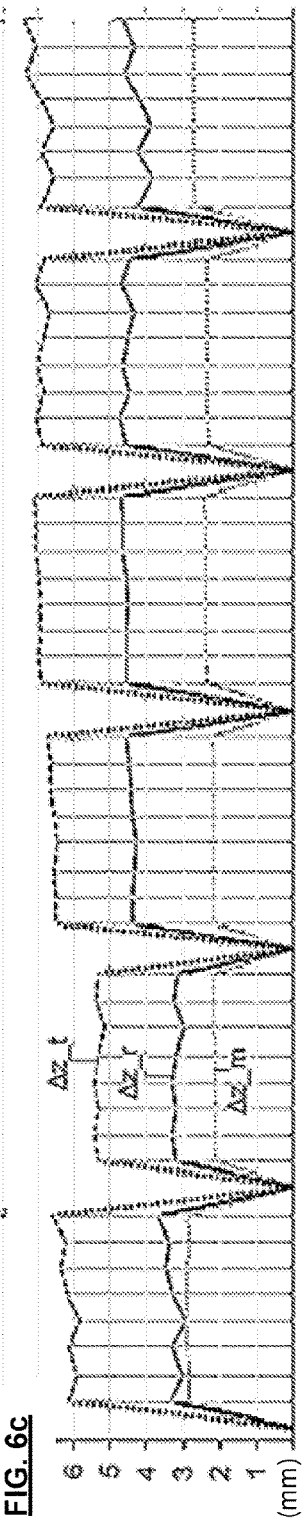

FIGS. 6a,b,c are graphs showing the recorded measurements (all in mm) of the process. ($\Delta$x,y,z_t) is the total variation in the given direction (x,y,z respectively) measured with respect to the rest pose, and therefore corresponds with a difference in the Cartesian position of the robot endpoint. The measured deformation of the FBE by the metrology system 62, as the displacement that occurred between the rest pose and the stabilized load case, is noted as ($\Delta$x,y,z_m). $\Delta$x,y,z_r is the determined robot deviation under the given load, computed as the total variation ($\Delta$x,y,z_t) minus the measured displacement ($\Delta$x,y,z_m). It will be noted that the amplitudes of the measured displacements observed due to the FBE deformation and microslippage were not negligible, and would have substantially impacted the measurement quality. It was noted that no permanent marking of the tooling 60 was observed after completion of the measurement sequence.

While the measurement of the FBE 58 is required to the extent that the constraint deforms, or the FBE deforms, there is nothing essential about how this measurement is made. There are disadvantages to external, line of sight, metrological systems, even if the accuracy was very high for the experiment. It may be preferable not to require line of sight visibility, and also to limit a number of sources of information. So there are several reasons to develop an integrated robot end-of-arm measurement device including the FBE. It is particularly preferred to instrument the FBE to assess deformation, and potentially microslippage as well. Well-known mechanical, optical, piezoelectric, electric, magnetic or thermal techniques could be used to obtain a measure of deformation of the FBE.

FIG. 7a is a schematic illustration of a pictorial view of an instrumented, robot end-of-arm measurement device 58 having a generally cylindrical body with an insertion end 65, for mounting to an end effector, and a FBE 59 for making the tribological contact with a constraint, at an opposite end. FIG. 7b is a plan view of the same, showing a section plane BB, and FIG. 7c shows a partial section view along that section plane. The instrumentation for position measurement is provided by a metrology target 68 that is mounted close to the FBE 59 near a central axis of the measurement device 58, and an optical pathway 69 that permits interrogation of the metrology target 68 with known laser metrology. A rigid mounting of the metrology target 68 to the measurement device 58 ensures that the metrology target 68 represents the position (x,y,z) of the measurement device 58 with high accuracy.

In the illustrated embodiment, three LVDTs 66 (not provided on the device 58 used in FIG. 4) are also provided rigidly mounted to the measurement device 58, and surrounding the FBE 59, to measure pitch, and yaw, of the measurement device 58 with respect to the surface of the constraint. These LVDTs 66 were not needed in the experiment because solicitations in pitch and yaw were not used, and errors in these dimensions were negligible. Embodiments requiring solicitations in pitch and yaw may advantageously use the 3 LVDTs 66, and avoid costlier 6 DoF targets and metrological equipment. The resultant instrumentation measures 5 DoF displacements of the robot end in the Cartesian space, x, y, z, pitch, and yaw.

The FBE 59 is illustrated having an annular cylindrical form, which is ideal for enhancing tribological contact with a suction chamber that is naturally produced in the central region of the annulus. By evacuating this chamber relative to ambient, the FBE 59 is urged into more intimate contact with the constraint, increasing a tribological resistance produced by the tribological contact.

FIGS. 8a-d are respectively pictorial, side elevational, cross-sectional, and enlarged cross-sectional views of a second embodiment of a measurement device 58. While the foregoing examples assumed a 6-DoF force/torque sensor used in a closed force feedback loop, some production end effectors incorporate force sensor arrangements that are incompatible with load cases including moments transferred to the robot end. While additional strain gages or force sensors can always be added and integrated, it is possible to preclude transmission of moments, to neutralize the effect of such moments. Specifically the second embodiment of the measurement device 58 has a ball joint 72 (or another effective 3 DoF joint) coupling the body of the measurement device 58 with the FBE 59. An optional set of springs 70 are used to bias (a meeting surface of) the FBE 59 in an orientation substantially perpendicular to an axis of the measurement device 58.

If load case solicitations are limited to x, and y directions, of the three moments that could be applied by interaction with the constraint, pitch and yaw are expected to be the most prevalent, but are expected to have a small amplitude, and result in small angular displacements. Accordingly, a large range of motion in the pitch and yaw rotational axes is not required, which is preferable as cost effective joints adapted for communicating great forces, often have limited range. It will be noted that roll may be entirely neglected, and a universal joint can be used instead of the ball joint, where available.

While the previous examples of measurement devices 58 have metrology targets for interrogation by an external metrology system, it may be preferable to avoid reliance on such systems. Particularly if a high stiffness, or well characterized, tooling is used for the constraint, the complete metrology instrumentation, including the metrological system 62, target 68, and optical pathway 69 can be replaced with a local displacement measurement system. FIGS. 9a-c schematically illustrate measurement device 58 with such a substitution: FIG. 9a showing a pictorial view; FIG. 9b showing a longitudinal cross-sectional view; and FIG. 9c showing a transverse cross-sectional view. FIG. 9b shows a transverse section line for the view of FIG. 9c.

Each of three LVDTs has a respective metrology target, as well as measurement devices for determining a distance thereto. LVDT 79 measures axial (z direction) movements, and two micro-LVDTs 78 measure linear motions in x and y directions, of a spring-mounted bob 75 as a result of deformation of the FBE 59, and possibly microslippage, as well. The micro-LVTDs 78 are rigidly mounted to the measurement device 58, and coupled to respective registration surfaces of the bob 75, that are one dimensional metrology targets. To provide a linear measurement of deformation of the FBE 59, the bob 75 is in contact with the constraint by means of a coil spring 77. Assuming a relatively flat constraint (on the scale of the FBE 59) and a substantially normal measurement device 58, and assuming that spring 77 is a weakest force in the system, once the FBE 59 makes contact with the constraint, and the force is applied to engage the tribological contact, the normal deformation (along the z direction) of the FBE 59 will be recorded as a displacement of the LVDT 79. The LVDT 79 can be engaged when the rest pose is taken, to provide a local, on-board baseline measurement. Once the tribological contact is established and stability is reached, the LVDT 79 will have a stable reading.

When a load case is applied, it will apply a shearing force on the FBE 59, resulting in a shear strain that may be of sufficient displacement to interfere with a deviation under load measurement. To measure this displacement, we rely on the spring 77 to provide sufficient pressure to hold the bob 75 against the constraint, and on a stable surface contact via coating 76. This contact with the coating ensures that, under the minimum force applied by the spring 77 while the tribological contact is maintained, the bob 75 will not slip, and will not tilt (pitch or yaw), but will instead remain fixed with respect to the constraint. As the bob 75 is free to move within the radial limits of the space between the bob 75 and FBE 59, the shear strain (displacements in directions x,y) is measured by the micro-LVDTs 78.

By the same action, the microLVDTs can identify microslippage. The stability of the surface contact between the bob 75 and the constraint may be augmented by selecting a polymeric surface with a suitable tackifier, by thermal adhesion, or by applying a suction or like fluid pressure compartment to retain the bob 75 in place. Microslippage may be detected, and such detection may be used to signal a repetition of the measurement, and increase in the normal force, or a correction in a value measured, or an increased uncertainty thereof.

It will be noted that the micro-LVDTs shown are contact-type displacement measurement devices, and that non-contact optical, acoustic, electromagnetic, and other types of measurement devices can equivalently be used.

It will be appreciated that a secondary spring could be added to partially counteract the spring 77, to increase the bob's 75 resistance to tilting in pitch or yaw, decrease an extent to which the bob 75 is biased to extend, for example.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for determining a deviation of a multi-jointed robot subjected to a load, the method comprising:
    moving an end of the robot to a measurement pose adjacent a constraint;
    applying a first force to press the robot end into tribological contact with the constraint;

soliciting the robot to move the end in one direction that is resisted by the tribological contact while the tribological contact is maintained, where the solicitation exerts a second force that is insufficient to overbear the tribological contact's resistance; and quantifying the second force in the resisted direction, and a variation in position of the robot from the robot's encoders resulting from the solicitation.

2. The method of claim 1 further comprising a preliminary step of mounting a friction bearing element (FBE) onto the robot directly, or via: an end effector, a production end effector, a part added to a production end effector, an end effector with one or more parts added or removed, a tool, a production tool, or a production tool with one or more parts added or removed, and wherein moving the end of the robot involves moving the FBE into position adjacent the constraint.

3. The method of claim 2 or wherein the FBE has a contact surface of a material to prevent marking or material transfer during the tribological contact at a force having a magnitude of 1 KN or greater.

4. The method of claim 3 further comprising:
determining a displacement of the robot end during the tribological contact by:
using a well characterized deformation of the selected material, and fitting at least the first and second forces to a model of the deformation;
measuring a deformation of the selected material relative to a surface of the constraint at the measurement pose; or
measuring a change in position of a metrological target on the robot end with respect to a reference frame that is fixed with respect to a grounding of the robot, and
determining the deviation by calculating a difference between the determined displacement from the variation in position, and associating the second force with the difference.

5. The method of claim 1 wherein
moving the robot end comprises moving the end over a free surface of the constraint to the measurement pose, and
a shape, size, and conformability of an area of the end that makes the tribological contact with the constraint, relative to a curvature of the free surface, permits tribological contact to be made at any location on the free surface.

6. The method of claim 1 wherein soliciting the robot to move while the tribological contact is maintained comprises commanding the robot to maintain the first force in a direction normal to the constraint throughout the tribological contact, where the first force is greater than the second force times a pre-established constant of proportionality.

7. The method of claim 1 wherein the second force has a lower magnitude than the first force and is applied quasistatically.

8. The method of claim 1 wherein soliciting the movement comprises:
directing the robot in a force control mode to exert the second force, the force control mode being enabled by a force sensor: provisioned with the robot; mounted to the end; in an end effector; or in a friction bearing element, and
forwarding at least select force control feedback from the force sensor to a processor for executing a computer program for determining the deviation, and associating the second force with the determined deviation.

9. The method of claim 8 wherein directing the robot in force control mode comprises:
operating the robot in a force control mode to apply the first force, and exert the second force, while keeping the robot free of moments in pitch and yaw;
operating the robot in a force control mode to apply the first force, and exert the second force, where an effective joint in the robot end precludes the robot from applying moments in pitch and yaw; or
operating the robot in a force control mode to apply the first force, and exert the second force, and may apply a torque in pitch and yaw, where the torque in pitch and yaw are also quantified, and forwarded to the processor.

10. The method of claim 8 further comprising the processor determining the deviation by:
receiving the variation in position of the robot determined from a difference between encoder readouts at first and second stable positions, the second stable position being produced when the robot stabilizes after the second force is applied;
receiving from the force sensor the select force feedback, which includes at least the second force;
using a third force, which is a force applied at the first stable position, and the second force to compute a difference in force; and
calculating a deviation of the robot and associating the deviation with the difference in force.

11. The method of claim 10 wherein the first stable position is the measurement pose adjacent the constraint, and at most negligible force is applied in the first stable position, whereby the third force is null, the difference between the second and third force is the second force.

12. The method of claim 1 wherein the soliciting and quantifying are repeated for a plurality of the resisted directions, including diametrically opposed directions for tribological contact at each of one or more measurement poses.

13. The method of claim 1 further comprising improving the tribological contact by one or more of the following:
cleaning a surface of the constraint and a part of the robot that meet to form the tribological contact prior to moving;
changing a pressure in a sealed fluid chamber near the tribological contact to produce enhanced surface contact by the pressure difference; or
engaging a magnetic tool positioned behind the constraint.

14. An apparatus for measuring deviation of a multi-jointed robot under load, the apparatus comprising:
a robot with an end flange;
a friction bearing element (FBE) mounted to the end flange directly, or via an end effector or end tooling;
a force sensor within the robot, or mounted to the end flange directly, or via an end effector, end tooling, or the FBE; and
a computer processor with a memory, in communication with the force sensor and the robot,
wherein the computer processor has program instructions for:
directing the robot to move the FBE into a measurement pose adjacent to a constraint located within an envelope of the robot;
applying a first force to press the FBE into tribological contact with the constraint;
soliciting the robot to move in one direction that is resisted by the tribological contact while the tribological contact is maintained, where the solicitation exerts a second force that is insufficient to overbear the tribological contact's resistance; and quantifying the second force and a change in position of the robot from the robot's encoders due to the resistance to the solicitation, and using same to determine a deviation of the robot.

15. The apparatus of claim 14 further comprising at least one of:

a joint mounted between a flange of the robot and an interface where the tribological contact is made, that has at least one rotational degree of freedom, about an axis perpendicular to a local normal of the interface, to neutralize moments about the axis; and a metrological target mounted to the robot between the end flange and an interface where the tribological contact is made, the metrological target adapted to be used for measuring a deformation of the FBE during the tribological contact, and wherein the computer processor is adapted to subtract the measured displacement from the change in position of the robot, to determine the deviation.

16. The apparatus of claim 14 wherein the FBE:

is composed of a material that does not mark or transfer material during the tribological contact at a force having a magnitude of 1 KN or greater; or comprises a sealed fluid chamber near the tribological contact to produce enhanced surface contact by controlled application of a pressure difference within the chamber.

17. The apparatus of claim 14, wherein the force sensor is adapted to provide realtime output of force data to the computer processor, the realtime output being used to effect a force control mode for the robot that permits the computer processor to apply the first force, solicit the robot, and quantify.

18. The apparatus of claim 17 wherein the program instructions for using the quantified second force and change in position comprise program instructions for:

determining the variation in position of the robot from a difference between encoder readouts at first and second stable positions, the second stable position being produced when the robot stabilizes after the second force is applied;

receiving from the force sensor at least select force feedback, which includes at least the second force;

using a third force, which is a force applied at the first stable position, and the second force to compute a difference in force; and calculating a deviation of the robot and associating the deviation with the difference in force.

19. A kit for use in determining deviation of a multi-jointed robot under load, the kit comprising a friction bearing element (FBE) for mounting to an end of the robot and one or more of:

b) non-transitory computer readable program instructions for:

determining a variation in position of the robot by from a difference between encoder positions at first and second stable positions, wherein at least the second stable position is a result of a force exerted in a tribologically resisted direction after the robot is pressed against a constraint to form a tribological contact;

receiving from a force sensor mounted directly or indirectly to the robot, at least select force feedback for computing at least a difference between forces applied at the first and second stable positions; and calculating a deviation of the robot under a load as the variation in position associated with difference between the forces; and c) non-transitory computer readable program instructions for obtaining a specification of the constraint, and a location of the FBE mounted directly or indirectly to the robot, and commanding the robot to perform the following steps:

directing the robot to move the FBE into a measurement pose adjacent to a constraint located within an envelope of the robot;

apply a first force to press the FBE into tribological contact with the constraint;

solicit the robot to move in one direction that is resisted by the tribological contact while the tribological contact is maintained, where the solicitation exerts a second force that is insufficient to overbear the tribological contact's resistance; and record a position of the robot as determined from its encoders, when the second force is solicited.

20. The kit of claim 19 further comprising one or more of:

d) an end effector for the robot to which the FBE is mounted or readily mountable;

e) a production end effector for the robot to which the FBE is mounted or readily mountable with one or more parts of the production tooling removed;

f) a tool to which the FBE is mounted or readily mountable;

g) a production tool to which the FBE is mounted or readily mountable; and h) a metrological target adapted for measuring a deformation of the FBE when first and second forces are applied.

21. The kit of claim 19, wherein the FBE is provided on a robot end-of-arm measurement device, the measurement device comprising:

a body having two opposite ends, a first end bearing an adapter for coupling to a flange of a robot, an end effector or a tool mounted to a robot, or an end effector or tool mounted to the robot with one or more parts added or removed, and a second end with a friction bearing element (FBE) having surface properties promoting tribological contact with hardened smooth tooling; and a target for a metrological system to measure a position of the measurement device.

22. The kit of claim 19, wherein the measurement device according to claim 21 further comprises an LVDT that references the target to measure a deformation of the FBE; or wherein the target is a retroreflector.

* * * * *